US007428939B1

(12) United States Patent
Ducote (10) Patent No.: US 7,428,939 B1
(45) Date of Patent: Sep. 30, 2008

(54) WATERJET DRIVE HOVERCRAFT WITH ADJUSTABLE TRIM SYSTEM

(75) Inventor: John Ducote, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 257 days.

(21) Appl. No.: 11/499,974

(22) Filed: Jul. 31, 2006

(51) Int. Cl.
*B60V 1/00* (2006.01)

(52) U.S. Cl. ............... 180/116; 180/117; 180/120; 180/121; 180/122

(58) Field of Classification Search .......... 180/116, 180/121, 122, 124, 129, 130
See application file for complete search history.

(56) References Cited

U.S. PATENT DOCUMENTS

| | | | | |
|---|---|---|---|---|
| 3,889,030 A * | 6/1975 | Fitzgerald et al. | ........... | 180/121 |
| 4,821,829 A * | 4/1989 | Gilbert et al. | ........... | 180/127 |
| 5,097,919 A * | 3/1992 | Cox | ........... | 180/117 |
| 5,386,880 A * | 2/1995 | Dubose | ........... | 180/117 |
| 5,871,061 A * | 2/1999 | Ashton | ........... | 180/116 |
| 7,296,526 B1 * | 11/2007 | Dubose | ........... | 114/67 A |
| 2006/0169508 A1 * | 8/2006 | Trojahn | ........... | 180/117 |
| 2007/0056788 A1 * | 3/2007 | Dubose et al. | ........... | 180/121 |
| 2008/0054121 A1 * | 3/2008 | Yoeli | ........... | 244/12.1 |

* cited by examiner

*Primary Examiner*—J. Allen Shriver
*Assistant Examiner*—Tashiana Adams
(74) *Attorney, Agent, or Firm*—James T. Shepherd (57) ABSTRACT

A flexible skirt-cell system is provided for a hovercraft having a propulsion system mounted to interface with water and a flexible skirt having an upper flexible panel section and a lower flexible finger section. The panel section extends around the bow, stern and two sides of the hovercraft hull and the finger section extends around the hull below the panel section and is connected to the panel section from a forward-abeam location and forward along the two sides and across the bow. Fans create pressurized air that is fed through air ducts to form a pressurized air cushion that supports the hovercraft. Interconnected flexible cells are connected between the panel and finger sections from the forward-abeam locations rearward to the stern. Additional air ducts pass pressurized air from the fan units to inflate the cells, thereby elevating the stern and raising the propulsion system above the water.

19 Claims, 6 Drawing Sheets

WATERJET DRIVE HOVERCRAFT WITH ADJUSTABLE TRIM SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to amphibious hovercraft vehicles. More particularly, this invention is to a hovercraft vehicle having a waterjet/water propeller drive system capable of being raised above the water-air interface by a skirt cell system for traversing dry land, soft mud, marsh, and tidal flat areas.

Hovercrafts, also known as Air-Cushioned Vehicles (ACVs), are typically marine craft that ride on a pressurized cushion of air. The air cushion serves to separate the vehicle from the surface over which it operates allowing freer movement and greatly decreasing the hydrodynamic drag. The lower drag allows much greater speeds to be achieved at lower drive power when compared to conventional displacement hulls. Powered lift fans are needed to maintain the flow of pressurized air under the vehicle due to the flow of air escaping from the cushion, and the amount of air escaping is typically minimized by including some sort of flexible fabric system, known as a "skirt", in order to better contain the air cushion by conforming more closely to irregular operating surface, such as waves or uneven terrain.

The separation of the hovercraft vehicle from the surface makes it potentially capable of truly amphibious operation. This means it has the ability to traverse dry land as well as open water, in addition to soft mud, marsh, or tidal flat areas impassible to any other type of vehicle. However, amphibious capability is only achievable if the means of propulsion is not restricted to only water-borne use. This means that systems incorporating water propellers and/or waterjet drive propulsion cannot be used in amphibious hovercrafts, as these will not be effective for land or very shallow water operations. Furthermore these water drive mechanisms will generally need to be located below the vehicle's normal waterline, where they would drag along the ground during land transit and impede movement and damage the mechanisms. As a result, amphibious hovercrafts typically employ some means of air propulsion, usually air propellers, or sometimes air is ducted from the lift fans and directed to achieve thrust for propulsion.

The disadvantage of the air propulsion systems normally employed with amphibious hovercrafts is that they are very inefficient and noisy. Air propellers also require a large amount of vehicle space, and because of vibration, exposure to sand and ingestion of water, maintenance issues arise.

By contrast propulsion by waterjet/propeller systems is much more efficient, quiet, and compact, and consequently, this means of propulsion is being used reliably in many commercial marine vehicle applications. Higher fuel efficiency means that a heavy-lift hovercraft can carry more payload in lieu of fuel, or can carry a payload for greater distances. Waterjet/propeller propulsion systems are more "harbor friendly" in that the vehicle can operate in restricted waterways next to piers and other crafts without blasting them with high velocity air and waterspray as well as undue noise.

However, conventional designs for hovercraft vehicles are presently incapable of effectively incorporating the advantages of both hovercraft and waterjet/propeller propulsion systems. This operational inability is due to design limitations inherent in conventional hovercraft design. Normally the gap beneath the hovercraft, also known as "cushion height", is adjustable by varying the air flow and pressure to the cushion. Changing the cushion height is easily done by either adjusting the fan speed or by controlling the flow with adjustable vanes inserted into the air ducts feeding fan air to the cushion. If a conventional hovercraft were to include water propulsion means such as a waterjet intake located on the hull underside, the vehicle could potentially increase its cushion height to the point where no contact would be made with the land surface for overland operations. Land transit would not be impeded provided that the vehicle employed alternate means for land propulsion such as air jets or mechanical traction devices. However, to put the waterjet intake into contact with the water to allow it to draw in water would necessarily require that the hull underside be in close proximity with the water surface. Such close contact would impede the waterborne operational capability of the hovercraft in all but the calmest water conditions, as wave interaction with the hull would impede the water transit and negate the advantages of the air cushion, i.e. the cushion height would not be large enough.

Thus, in accordance with this inventive concept, a need has been recognized in the state of the art for a system for adjusting trim of a hovercraft vehicle to maintain the majority of the underside of the hovercraft vehicle's hull a suitable distance from the water surface for waterborne operations and to raise up the hovercraft where the waterjet intakes or water propellers are located for land operations by selectively inflating or deflating strategically located skirt cells to control the elevation of the waterjet intakes or water propellers.

OBJECTS AND SUMMARY OF THE INVENTION

An object of the invention is to provide a hovercraft capable of land transit and having waterjet or water propeller propulsion systems.

Another object of the invention is to provide a hovercraft propelled by waterjet or water propeller propulsion systems being capable of transitioning across beaches and over land.

Another object of the invention is to provide a hovercraft having a plurality of extensible cells to raise waterjet intakes or water propellers to allow traversal of dry land, soft mud, marsh, and tidal flat areas.

Another object of the invention is to provide an amphibious hovercraft provided with selectively extensible and retractable cells to allow traversal of dry land, soft mud, marsh, and tidal flat areas and more efficiently traverse open water via waterjet or water propeller propulsion systems.

Another object of the invention is to provide an amphibious hybrid craft having selectively extensible and retractable skirt cells to allow use of waterjet or water propeller propulsion systems that permit greater speed during high-speed transit in open water.

These and other objects of the invention will become more readily apparent from the ensuing specification when taken in conjunction with the appended claims.

Accordingly, the present invention is to an inflatable skirt cell system for an amphibious hovercraft. The hovercraft has a hull having a bow, stern and two sides in its periphery and at least one propulsion system is mounted on the hull to extend below and physically interface with a water surface over which the hovercraft is traveling. A flexible skirt has an upper flexible panel section and a lower flexible finger section. The upper panel section extends around the bow, stern and two sides of the hull adjacent to the periphery. The lower finger section extends around the hull below and adjacent to the upper panel section and is connected to the upper panel section from a forward-abeam location and forward along the two sides and across the bow. Lift-fan units create volumes of pressurized air and have first and second air flow ducts. The first air flow ducts are coupled to lift-fan units for passing portions of pressurized air under the hull inside of the flexible skirt to form a pressurized air cushion to support and transport the hull. An inflatable cell system is connected between the upper panel section and the lower finger section from the forward-abeam location on the two sides aft, or rearward, along the sides and across the stern of the hull. The inflatable cell system has a juxtaposed series of interconnected flexible inflatable cells connected to the second ducts for inflating the cells to raise the propulsion system above the water. A first controllable vane (that could be one or a series of several vanes) is provided in each first air duct, a second controllable vane (that could be one or a series of several vanes) is provided in each second air duct, and an auxiliary propulsion means is mounted on the hull to propel the hovercraft on land areas. Selective control of the first controllable vane(s) and first air duct passes portions of pressurized air to create the air cushion under the hull, selective control of the second controllable vanes and second air flow ducts assure the inflating of the inflatable cells with additional portions of the pressurized air and the raising of each propulsion system, and selective control of the second controllable vanes and second air flow ducts allows deflation of the inflatable cells for lowering each propulsion system into the water. The inflatable cells of the juxtaposed series start at forward-abeam locations on both of the sides and have progressively increasing volumes as the series progresses to the stern where they have substantially the same volumes as they extend across the stern.

DESCRIPTION OF THE PREFERRED EMBODIMENT

Figure 1:
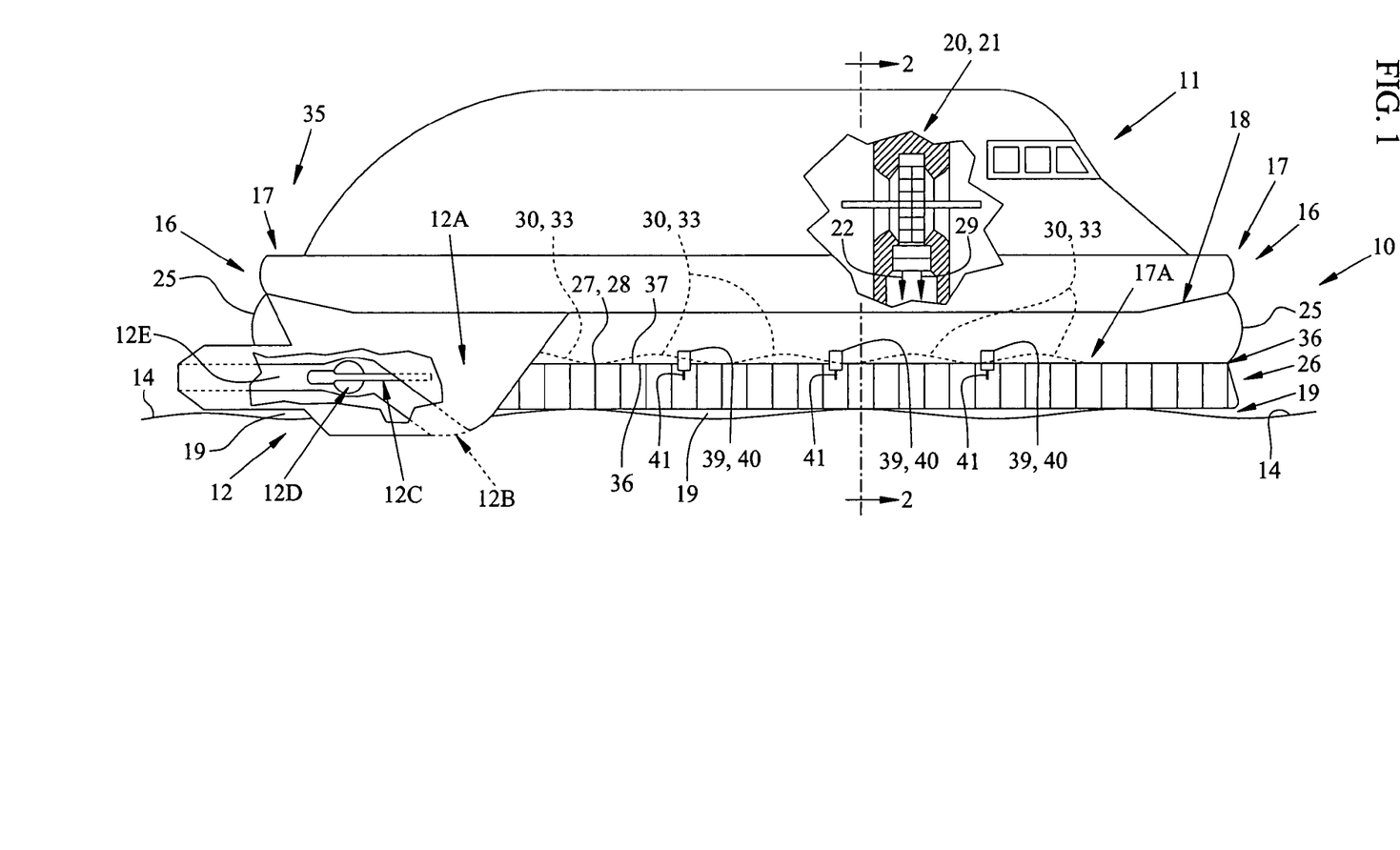
FIG. 1 is a side view in partial cross section of a hovercraft driven by a waterjet propulsion system in the waterborne operating mode with the skirt cell system of the invention deflated in the selectively retracted position.
Figure 2:
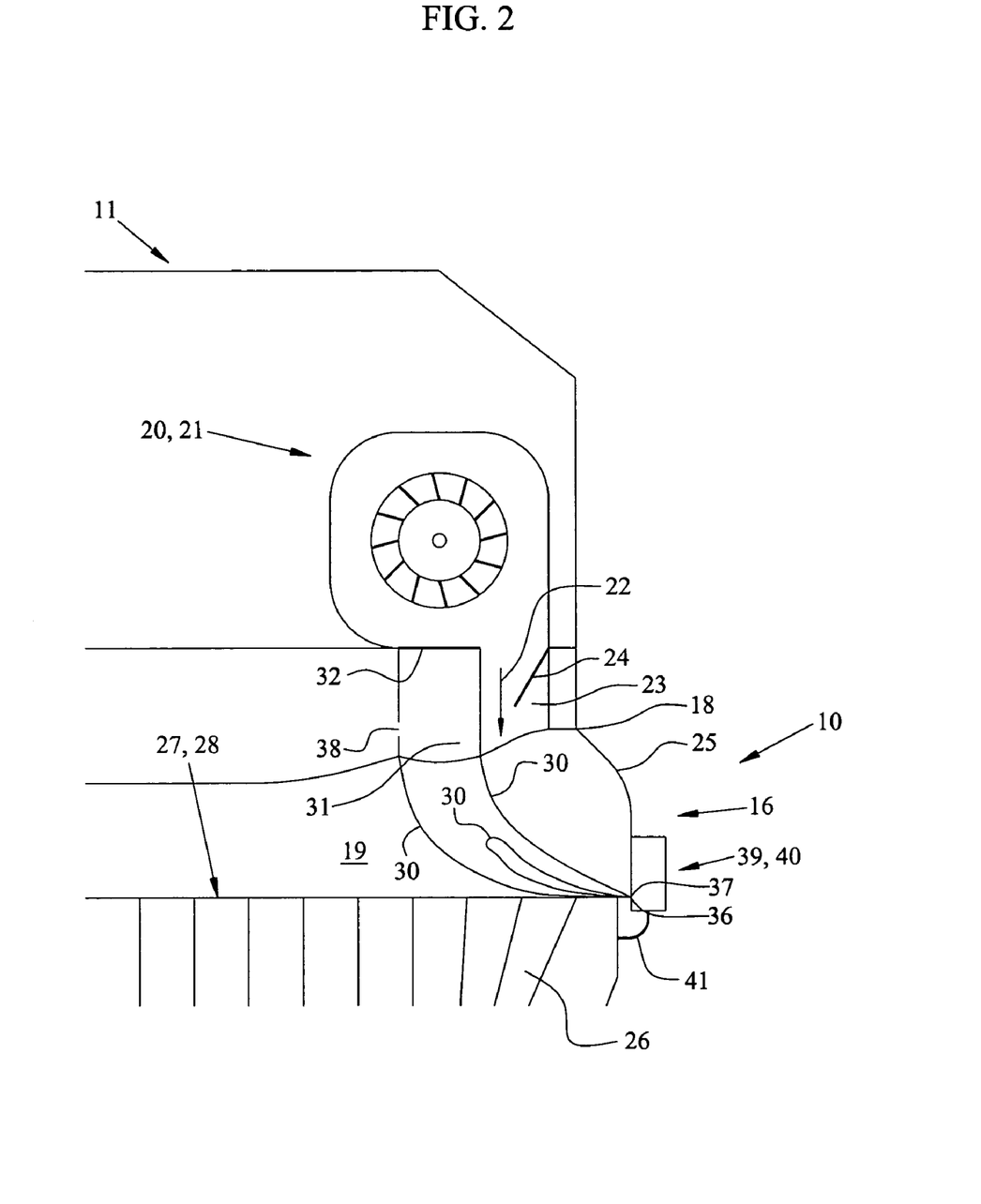
FIG. 2 is a partial cross sectional view taken athwartships, generally along line 2-2 of FIG. 1, showing details of a lift fan, duct, and flexible cell of the skirt cell system during high speed transit across open water by the waterjet propulsion system.

Referring to FIGS. 1 and 2, a flexible inflatable skirt cell system 10 of the invention is provided on a hovercraft 11 to adjust the trim of the hovercraft 11. Trim adjustment allows a waterjet propulsion system 12 or water propeller/water screw propulsion system 13 (FIGS. 5 and 6) to propel hovercraft 11 at high speed across open water 14 or, alternatively, permits hovercraft 11 to transit across different areas of land 15 (FIG. 3).

Waterjet propulsion system 12 or water propeller propulsion system 13 have demonstrated greater speeds and increased levels of operating efficiency and control when hovercrafts operate across open water 14 as compared to conventional means for propelling them (i.e., air propellers). However, these propulsion systems at the water-air interface cannot operate successfully over land so their advantages cannot be realized for conventional hovercraft. Skirt cell system 10 of the invention provides an effective and reliable means to retract the water jet/water propeller propulsion systems from the water-air interface and permits overland operations by a hovercraft 11 having a flexible skirt 16 extending from a hull 17.

Figure 3:
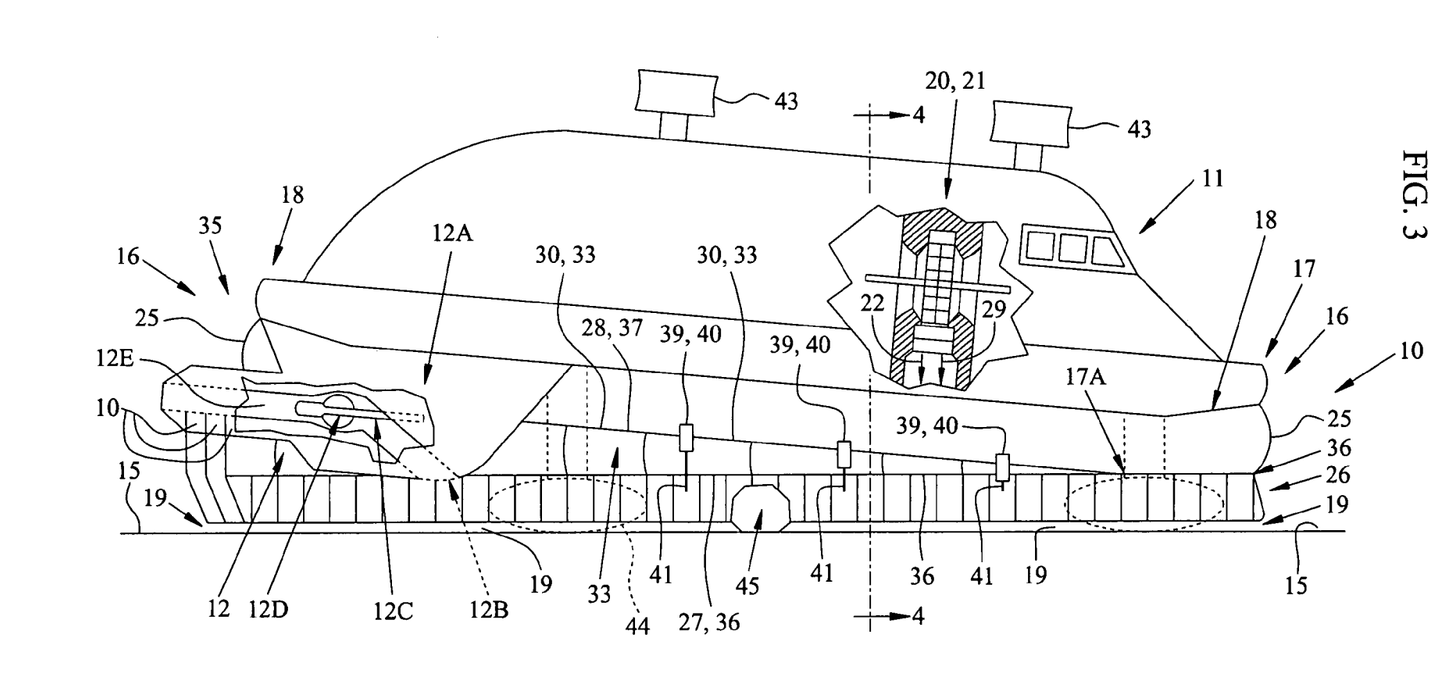
FIG. 3 is a side view in partial cross section of a hovercraft showing the hovercraft traversing a land area with the waterjet propulsion system raised by the skirt cell system of the invention.

Referring to FIGS. 1 and 3, typically, hovercraft 11 has one or more water jet propulsion systems 12 (only the nearest propulsion system 12 is shown) and each interfaces with a streamlined mounting structure 12A extending from hull 17. When operating on open water 14, a water intake port 12B can draw in some of ambient water 14 at or below the water-air interface. A shaft 12C driven by a propulsion motor (not shown) in hull 17 can rapidly rotate a water turbine mechanism 12D to forcefully pump out or expel the drawn-in water at high velocity through a discharge pipe 12E that may have articulating nozzles (not shown) for steering the hovercraft. Propulsion system 12 is not suitable for operation on land.

Figure 5:
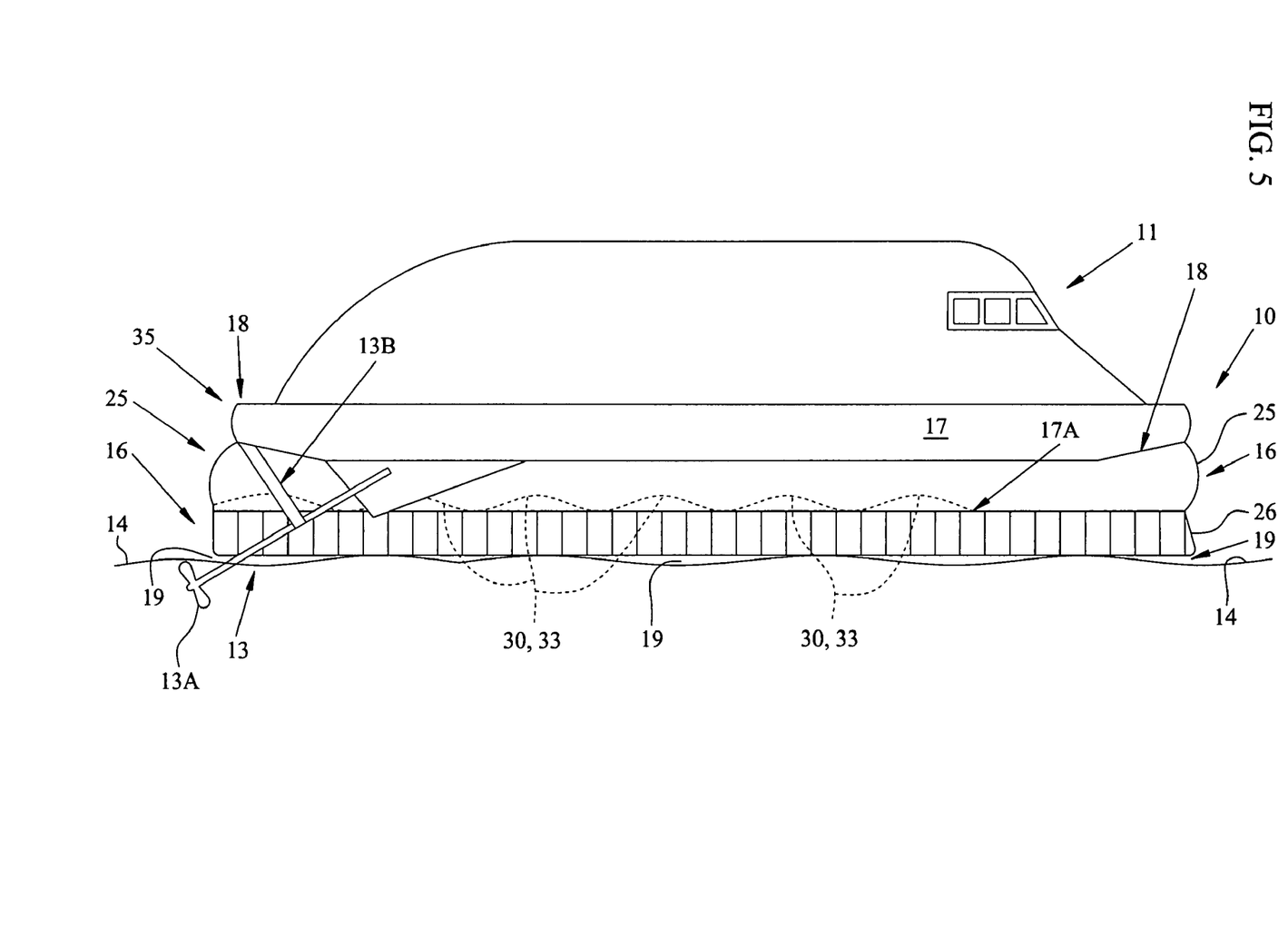
FIG. 5 is a side view in partial cross section of a hovercraft driven by a water screw/propeller propulsion system in the waterborne operating mode with the skirt cell system of the invention deflated in the selectively retracted position.
Figure 6:
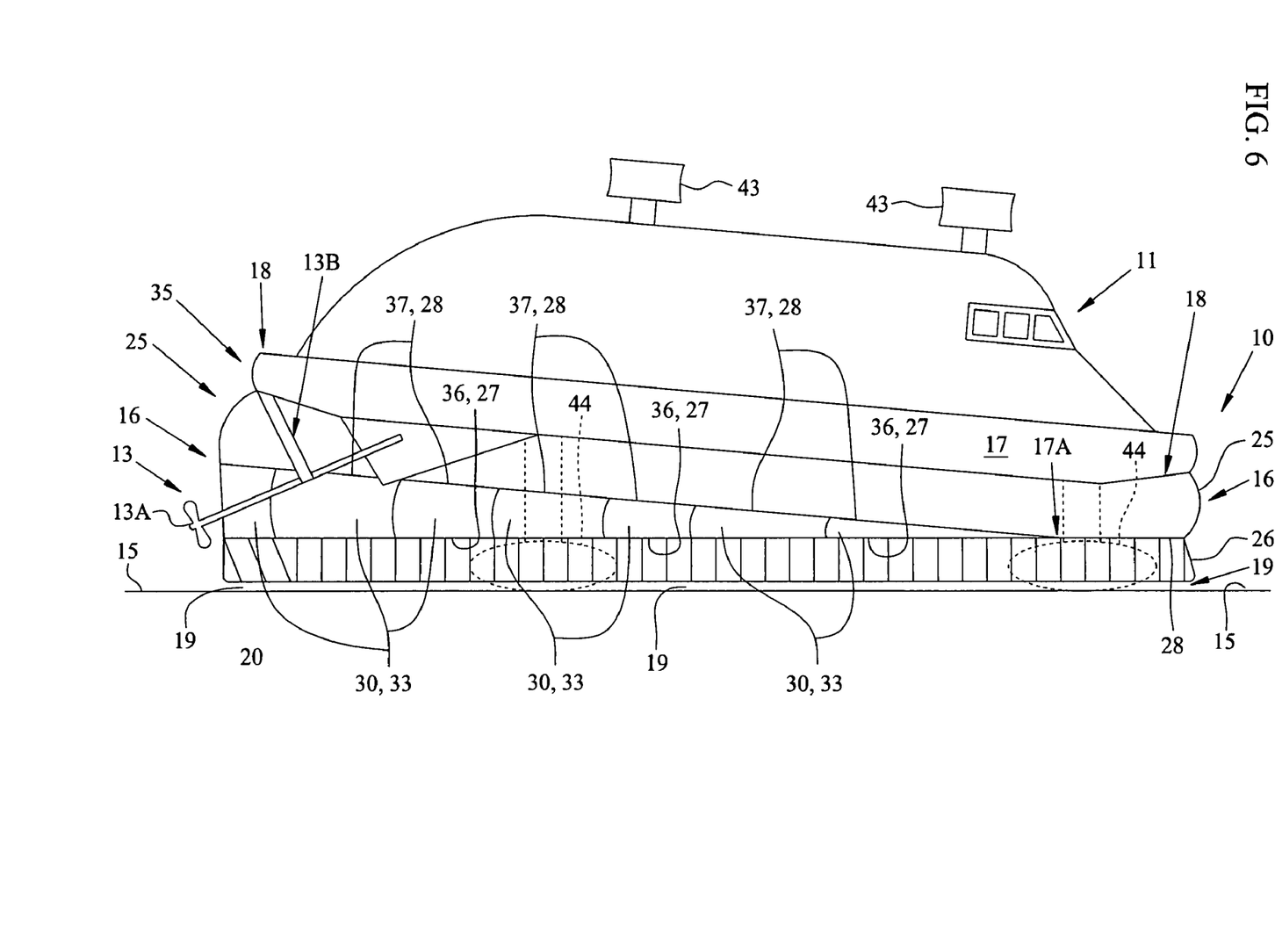
FIG. 6 is a side view in partial cross section of the hovercraft in FIG. 5 traversing a land area with the water propeller propulsion system raised by the skirt cell system of the invention.

The water propeller propulsion system 13 of FIGS. 5 and 6 has a conventional shaft mounted propeller 13A that may have a variable pitch and be reversible to implement steering. It is connected to an inboard propulsion motor (not shown) in hull 17 and held to extend to and below the water-air interface by stanchions 13B connected to hull 17. More than one such propulsion system 13 can be and usually is provided on hovercraft 11. Propulsion system 13 is not suitable for operation on land.

Hovercraft 11 has a flexible skirt 16 continuously connected to hull 17 about its periphery 18 to continuously extend downwardly from hull 17 around the lower perimeter of hovercraft 11. Although different shapes for hull 17 can be made, typically, most hovercraft have an essentially rectangular shape so that skirt 16 has a rectangular shape to contain a pressurized cushion of air, or air cushion 19 beneath hull 17. Creation of a supporting air cushion 19 makes hovercraft 11 truly amphibious and allows high-speed transit of hovercraft 11 across open water 14 and passage over land areas 15 including irregularities and obstacles. Such hovercraft 11 are well known in the art and have on-board machinery 20 to generate cushion 19. Only one gas turbine driven, propeller-like, lift-fan unit 21 of machinery 20 is shown. In accordance with sound and well established marine design criteria, sufficient numbers of lift-fan units 21 are provided to create an air cushion 19 inside of skirt 16 and to distend and maintain skirt 16 so that it supports hovercraft 11.

Referring to FIG. 2, each unit 21 forces a portion (shown by the arrow 22) of the total volume of air cushion 19 through a separate first air flow duct 23 through hull 17 so that the combined outputs of all lift-fan units 21 additively force sufficient volumes of pressurized air to create and maintain air cushion 19 for transit, maneuvering, and hovering of hovercraft 11. Each first air flow duct 23 has at least one controllable first vane 24 to selectively pass and change the volume of each portion 22 of pressurized air fed to pressurized air cushion 19 beneath hull 17. A control system (not shown) for the vanes can be located, e.g., at the craft operator's station or other convenient location on hovercraft 11. This feature allows operators on hovercraft 11 to change the flow rates, and thus the pressure in air cushion 19, to accommodate ongoing changes in payload, speed, water conditions and terrain, for examples.

Figure 4:
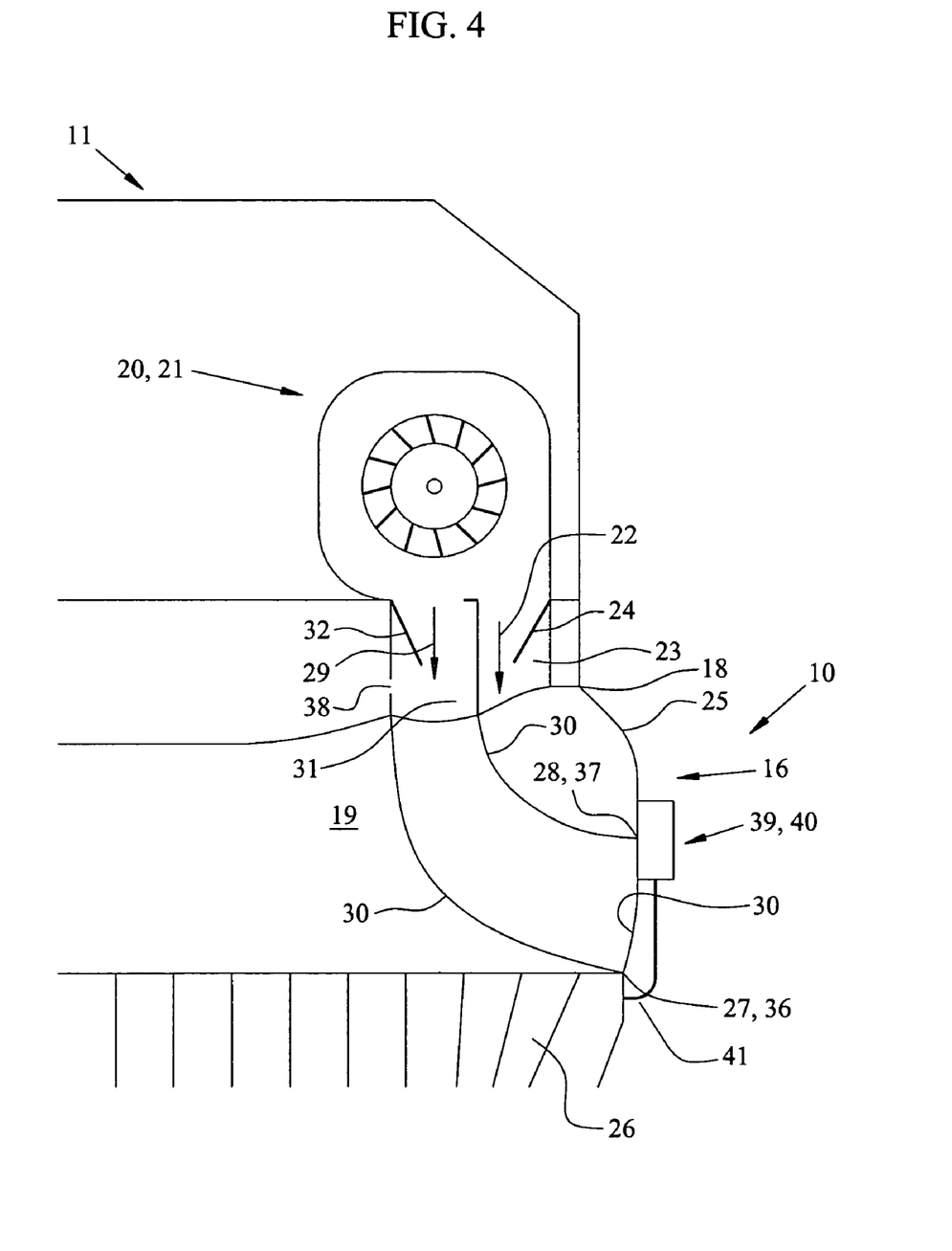
FIG. 4 is a partial cross sectional view taken athwartships, generally along line 4-4 of FIG. 3, showing details of a lift fan, duct, and flexible cell of the skirt cell system during transit across land.

Referring also to FIGS. 3 and 4, skirt 16 is fabricated to continuously extend downwardly from hull 17 from perimeter 18 and has an upper flexible panel section 25 connected to hull 17 and lower flexible finger section 26. Lower finger section 26 has a length of its upper edge 27 interconnected in a secure and sealed juncture along a length of the bottom-edge 28 of upper panel section 25. This juncture extends forward from forward-abeam locations 17A on both sides of hull 17 (only the location 17A on the near side being shown) and wraps across where skirt 16 extends across the front or bow of hovercraft 11.

Upper panel section 25 and lower finger section 26 of skirt 16 can be made like many other skirt and finger structures currently being utilized in contemporary hovercraft. Therefore, panel section 25 and finger section 26 are made from proven, known materials having sufficient strength, toughness, and flexibility to withstand the rigors of operational usage and to bear the stresses and strains routinely created as hovercraft 11 repeatedly makes high-speed runs over water 15 and travels over land 15.

As mentioned previously, lift-fan units 21 of on-board machinery 20 on hovercraft 11 each pass a portion 22 of pressurized air that collectively make sufficient volumes of pressurized air to create and maintain air cushion 19 for support and transport of hull 17 over water and land. Fan units 21 of machinery 20 also each create an additional portion (shown as arrow 29) of pressurized air that is fed to inflatable cells 30 of skirt cell system 10 of the invention.

Skirt cell system 10 includes a plurality of second air flow ducts 31 each coupled to a separate lift-fan unit 21 to feed each portion 29 of pressurized air to one or more inflatable cells 30. At least one separate controllable second vane 32 in each second air flow duct 31 passes controlled amounts of each portion 29 from each second air flow duct 31 to inflate the interconnected inflatable cells 30. The controllable second vanes can be controlled by the same control system mentioned above that controls the first vanes. Inflatable cells 30 of skirt system 10 of the invention can thus be selectively inflatable with pressurized air portions 29. This causes the stern of hovercraft 11 to rise up, which in turn will elevate waterjet propulsion system 12 or water propeller system 13 above the surface and permit overland travel of hovercraft 11 without dragging and damaging the more efficient water propulsion systems 12 or 13 on land 15.

Inflatable cells 30 of skirt cell system 10 are flexible bag-like structures made from tough, flexible material like the material of flexible panel section 25. The bag-like structures of inflatable cells 30 are made in an interconnected juxtaposed series 33 that have progressively increasing volumes as series 33 of inflatable cells 30 progresses and extends from forward-abeam positions 17A on hull 17 on opposite sides of hovercraft 11 aft, or rearward, to its stern 35. Across the stern 35 the size or volume of the cells 30 are each substantially the same. Series 33 of inflatable cells 30 is interposed between and secured along an elongate secure and sealed juncture 36 to upper edge 27 of lower finger section 26 and secured along an elongate secure and sealed juncture 37 to bottom-edge 28 of upper panel section 25. These secure, sealed junctures 36 and 37 extend in skirt 16 aft on both sides of hull 17 from sealed juncture points 17A and across the back of stern 35 of hovercraft 11. Optionally, the material that inflatable cells 30 of skirt cell system 10 are fabricated of may also have elastic properties that permit cells 30 to expand and contract as portions 29 of pressurized air are fed to them. This type material eliminates the need for other means for venting-away pressurized air when it is desirable to deflate series 33 of inflated cells 30, for example, when a land transit is completed and operations over open water are resumed.

A small vent opening 38, see FIGS. 2 and 4, can be provided in each second air flow duct 31 to bleed away a small part of each additional portion 29 of pressurized air. When controllable second vanes 32 are open and full amounts of pressurized air portions 29 are being passed to inflate cells 30, vent openings 38 release a small amount of portions of pressurized air 29, but the vented amount is so small that the inflated cells 30 of series 33 remain inflated. But, when second control vanes 32 are closed to shut off the flow of pressurized air portions 29 from fan units 21 to cells 30, vent openings 38 allow inflatable cells 30 to deflate to a minimum size so that upper panel section 25 and lower finger section 26 can come together as shown in FIGS. 1, 2, and 5.

Referring again to FIGS. 1, 2 and 3, skirt cell system 10 can have a plurality of interlocking surfaces or latch mechanisms 39 connected to lower finger section 26 and upper panel section 25 to help hold sections 26 and 25 together and series 33 of cells 30 in a collapsed deflated state as hovercraft 11 makes a high-speed run across water 14. When series 33 of cells 30 of skirt cell system 10 is to be inflated, the latch mechanisms 39 can be disengaged to free sections 26 and 25 from each other and allow series 33 of cells 30 to raise water jet or water propeller propulsion systems 12 or 13 above the water-air interface. When passage overland is completed and hovercraft 11 again is over water 14, parts of latch mechanisms 39 on sections 26 and 27 can be reengaged to secure sections 26 and 27 together and lower propulsion systems 12 or 13 into water 14 for high speed water-borne operations.

Optionally, a plurality of extensible mechanisms 40 could have one part containing a controllable winch (not shown) on one of sections 25 or 26 and the anchor part (not shown) connected on the other of the sections 25 or 26, for example. A cable 41 on each winch and extending to an anchor part could be wound tight to help hold sections 25 and 26 together particularly during high-speed operations, see FIGS. 1 and 2. When approaching land, additional portions 29 of pressurized air are vented to inflatable cells 30 of series 33 to push upper panel section 25 up and away from lower finger section 26 and lift propulsion systems 12 or 13 out of and above water 14 and hold them there (see FIG. 3). Simultaneously, cables 41 are unwound in extensible mechanisms 40 to permit full inflation of cells 33. After land passage is complete and hovercraft 11 returns to waterborne operations, controllable second vanes 32 are closed and vented portions 29 of pressurized air in inflatable cells 30 starts to be evacuated from cells 30. Winches in extensible mechanisms 40 wind cables 41 in and compress inflatable cells 30 to assure their complete evacuation of air. This places and holds sections 25 and 26 adjacent to one another and, accordingly, places propulsion systems 12 or 13 in water 14 for high-speed transit.

During waterborne operations, fan units 21 of on-board machinery 20 are activated to pass portions 22 of pressurized air past opened first control vanes 24 and through first air-flow ducts 23. This activation creates and maintains a sufficient volume of pressurized air in air cushion 19 to raise and keep the bottom of hull 17 above the top of water 14. Mounting structure 12A positions water intake port 12B of propulsion system 12 at or right below the surface of water 14 as shown in FIG. 1, or stanchions 13B position propeller 13A of propulsion system 13 to extend through the surface of water 14 as shown in FIG. 5. This positioning of systems 12 or 13 allows hovercraft 11 to be propelled more efficiently than conventional hovercraft using conventional air propeller or jet propulsion systems. In the open-water mode of travel, series 33 of inflatable cells 30 are deflated between upper panel section 25 and lower finger section 26. Sections 25 and 26 are held together to place propulsion systems 12 or 13 at the water-air interface where they are required to operate.

As land is approached, hovercraft 11 slows and skirt cell system 10 of the invention begins to be deployed by opening second controllable vanes 32 between lift-fan units 21 and second airflow ducts 31. Additional portions 29 of pressurized air from fan units 21 are fed past second control vanes 32. The magnitude of the volumes and hence the pressures of the additional portions 29 may be greater than the pressure of the pressurized air cushion to assure inflation of cells 30 of series 33. The additional portions 29 are fed through second air flow ducts 31 to interconnected inflatable cells 30 and the series 33 of inflatable cells is inflated to the extent shown in FIGS. 3, 4, and 6. Virtually simultaneously, propulsion motors in hull 17 of system 12 or system 13 are shut off while the inflated cells 30 of series 33 raise propulsion systems 12 or 13 above the surface as hovercraft 11 makes the water-land transition.

As the mounting structures 12A and intake ports 12B, or stanchions 13B and propeller 13A, are raised above water 14 and/or land 15 to the positions generally as shown in FIGS. 3 and 6, an auxiliary propulsion means such as one or more auxiliary air jet engines 43, air propellers (not shown) and/or motor driven tracked crawlers 44 (one tracked crawler 44 being shown in phantom beneath hull 17) can be extended from hull 17. The jets 43 and/or crawlers 44 can be turned on and articulated to propel and maneuver hovercraft across land areas 15 and avoid irregularities or obstacles 45 that might be on land areas 15.

Having the teachings of this invention in mind, other modifications and alternate embodiments of skirt cell system 10 for hovercraft 11 may be adapted without departing from the scope of the invention. Its uncomplicated, compact design lends itself to numerous modifications to permit its reliable use in hostile and demanding environments and surfaces, including but not limited to open water, beaches, mud, marsh, tidal flats etc.

Skirt cell system 10 for hovercraft 11 can be made larger or smaller in different shapes and fabricated from a wide variety of materials to assure resistance to corrosion, sufficient strength for heavy loads, and long term reliable operation under a multitude of different operational requirements.

Skirt cell system 10 for hovercraft 11, as disclosed herein is not to be construed as limiting, but rather, is intended to be demonstrative of this inventive concept. It should be readily understood that many modifications and variations of the present invention are possible within the purview of the claimed invention. It is to be understood that within the scope of the appended claims the invention may be practiced otherwise than as specifically described.

I claim:

1. A flexible inflatable skirt cell system for a hovercraft having a hull with a bow, stern and two sides in its periphery comprising:
    a flexible skirt having a flexible upper panel section and a flexible lower finger section, said upper panel section extending around said bow, stern and two sides of said hull adjacent to said periphery and said lower finger section extending around said hull below and adjacent to said upper panel section and being connected to said upper panel section from a forward-abeam location and forward along said two sides and across said bow;
    means for creating volumes of pressurized air having at least one first air flow duct and at least one second air flow duct, said first air flow ducts being coupled to said pressurized air volume creating means for passing portions of pressurized air under said hull inside of said flexible skirt to form a pressurized air cushion to support and transport said hull thereon;
    an inflatable cell system interposed between and connected to said upper panel section and said lower finger section from said forward-abeam location rearward along said sides and across said stern of said hull, said inflatable cell system having a juxtaposed series of interconnected inflatable cells coupled to said second ducts for selectively inflating said cells; and
    at least one propulsion system mounted on an aft portion of the hull and extending below said flexible skirt to interface with water over which the hovercraft travels.

2. The system of claim 1 wherein said inflatable cells increase in size as they are positioned further aft so that said skirt cell system raises each said propulsion system from and above said water when said inflatable cells are inflated.

3. The system of claim 2 further comprising:
    a first controllable vane in each said first air duct; and
    a second controllable vane in each said second air duct.

4. The system of claim 3 further comprising:
    auxiliary propulsion means on said hull to propel said hovercraft on land areas when said inflatable cells are inflated.

5. The system of claim 4 further comprising a control system coupled to each said first controllable vane to operate said first controllable vane to selectively pass portions of pressurized air to a corresponding said first air duct to create said air cushion under said hull; said control system also coupled to each said second controllable vane to operate said second controllable vane to selectively pass portions of pressurized air to at least one said second air duct to inflate said inflatable cells with additional portions of said pressurized air.

6. The system of claim 5 further comprising a vent in each said second air duct, said vent communicating with said air cushion under said hull and with said pressurized air in said inflatable cells, said vent configured to release air pressure from and deflate said inflatable cells, thereby causing each said propulsion system to lower into said water.

7. The system of claim 6 wherein said auxiliary propulsion means comprises at least one air propeller.

8. The system of claim 6 wherein said auxiliary propulsion means comprises at least one tracked crawler.

9. The system of claim 6 wherein said propulsion systems comprise waterjet propulsion systems.

10. The system of claim 6 wherein each said propulsion system comprises a propeller and propeller shaft.

11. The system of claim 6 further comprising means for releasably securing said upper panel section to said lower finger section at locations aft of said forward-abeam location.

12. The system of claim 11 wherein said means for securing comprises at least one winch coupled to one of said upper panel section and said lower finger section, and a cable 41 having one end coupled to the other one of said upper panel section and said lower finger section and another end coupled to said winch.

13. A method of raising from the water's surface at least one water propulsion unit on a hovercraft having a hull with a bow, stern, and two sides in its periphery, to permit land passage of the hovercraft, comprising the steps of:

providing a flexible skirt having a flexible upper panel section and a flexible lower finger section, said upper panel section extending around said bow, stern and two sides of said hull adjacent to said periphery and said lower finger section extending around said hull below and adjacent to said upper panel section and being connected to said upper panel section from a forward-abeam location and forward along said two sides and across said bow;

creating volumes of pressurized air;

passing portions of said created pressurized air through first air flow ducts into an area under said hull inside of said flexible skirt to form a pressurized air cushion to support and transport said hull thereon;

connecting a juxtaposed series of inflatable cells of an inflatable cell system to and between said upper panel section and said lower finger section from said forward-abeam location on said two sides rearward along said sides and across said stern of said hull; and coupling second airflow ducts to said inflatable cells;

passing additional portions of pressurized air through said second air flow ducts into said inflatable cells;

inflating said inflatable cells with said additional portions of pressurized air; and raising each propulsion system from the water's surface.

14. The method of claim 13 further comprising the steps of:

controlling the amount of said portion passed in each first air duct with a first controllable vane in each first air duct; and controlling the amount of said additional portion passed in each second air duct with a second controllable vane in each second air duct.

15. The method of claim 14 further comprising the steps of:

mounting an auxiliary propulsion means on said hovercraft; and propelling said hovercraft across land areas by said auxiliary propulsion means.

16. The method of claim 15 wherein said auxiliary propulsion means comprises air propellers.

17. The method of claim 15 wherein said auxiliary propulsion means comprises tracked crawlers.

18. The method of claim 15 further comprising the step of selectively connecting said inflatable cells so that said inflatable cells get progressively larger as they are connected from said forward-abeam locations on both of said sides rearward to said stern.

19. The method of claim 18 further comprising the step of venting said additional portions of pressurized air from said second air duct and said inflatable cells to said air cushion under said hull.

* * * * *